United States Patent [19]
Greenbank et al.

[11] Patent Number: 4,924,551
[45] Date of Patent: May 15, 1990

[54] APPARATUS AND METHOD FOR CLOSING OR SEALING A FLEXIBLE TUBULAR CONDUIT

[75] Inventors: Robin A. Greenbank, Blenheim; Arthur Van Der Velde, Christchurch, both of New Zealand

[73] Assignee: Elastrator Company Limited, Blenheim, New Zealand

[21] Appl. No.: 314,125

[22] Filed: Feb. 23, 1989

[30] Foreign Application Priority Data

Feb. 23, 1988 [NZ] New Zealand ............ 223600

[51] Int. Cl.⁵ ............................... F16L 55/10
[52] U.S. Cl. .......................... 17/1 R; 138/89
[58] Field of Search ............ 17/1 R, 11; 138/89, 138/95

[56] References Cited

U.S. PATENT DOCUMENTS

| | | | |
|---|---|---|---|
| 3,137,031 | 6/1964 | Ine | 17/11 |
| 3,147,513 | 9/1964 | Schneider et al. | 17/11 |
| 4,023,237 | 5/1977 | Meyn | 17/11 |
| 4,564,977 | 1/1986 | Scheier et al. | 17/11 |

*Primary Examiner*—Willis Little
*Attorney, Agent, or Firm*—Birch, Stewart, Kolasch & Birch

[57] ABSTRACT

An apparatus and a method for closing or sealing a flexible tubular conduit from within the conduit devised particularly for use in a slaughterhouse for sealing the anal passages of animal, and especially sheep carcasses to prevent their being soiled. The apparatus has an elongated member or barrel having a mouth at an operative end which is inserted into the conduit. Suction is applied to draw a flap of the conduit into the mouth and a stretched elastic ring which is carried on a ring support about the barrel is released by a ring releasing device to pass over the mouth and flap to contract about the flap and close or seal the conduit. The mouth is preferably annular and closable to clamp the flap while the ring is being released.

25 Claims, 6 Drawing Sheets

APPARATUS AND METHOD FOR CLOSING OR SEALING A FLEXIBLE TUBULAR CONDUIT

BACKGROUND OF THE INVENTION

The present invention relates to an apparatus and also to a method for sealing or substantially closing a flexible tubular conduit from within the conduit. The apparatus and the method have been devised particularly for use in the sealing or substantial closing of a body conduit of an animal. In the preferred application of the invention the apparatus and method are applied to the sealing or substantial closing of the anus of a sheep carcass. The invention will be described with reference to this preferred application. However, the invention can be applied to the sealing or substantial closing of other types of flexible tubular conduit, for example, sufficiently flexible plastics tubes.

In the past, the processing of freshly slaughtered sheep in freezing works involved the hanging of the sheep by their hind legs. This meant that the sheep were hung upside down with the anus of each sheep facing upwardly. The trend in freezing works today is to hang the carcasses by the forelegs which means that the anus of each carcass faces downwardly. This is known as the Annan inverted dressing system. This new system of dressing sheep carcasses is claimed to be faster and less labour intensive than the old system. However, a problem with the new system is that faeces can discharge from the carcasses and soil these. Soiled areas of the carcasses have to be cut away and each soiled carcass is downgraded resulting in a lower financial return. It was with this particular problem in mind that the present invention was devised.

SUMMARY OF THE INVENTION

An object of the preferred form of the present invention is the provision of an apparatus and a method for sealing or substantially closing the anus of a sheep carcass to prevent faeces from being discharged from that carcass even when the carcass is hung by its forelegs with the anus facing downwardly during the dressing of the carcass in a freezing works or abattoir.

In one aspect, the present invention broadly consists of an apparatus for sealing or substantially closing a flexible tubular conduit from within the conduit, the apparatus comprising: an elongated member having an operative end which elongated member is insertable operative end first into the conduit from an open end of the conduit; a mouth at the operative end of the elongated member; ring supporting means provided on or by the elongated member for supporting a stretched elastic ring about the elongated member; suction means whereby suction can be created at the mouth to draw a flap of the conduit into the mouth; and ring releasing means actuable to release the stretched elastic ring from the elongated member and over the mouth and flap drawn thereinto whereby the ring can contract about the flap to seal or substantially close the conduit.

It is preferable that the mouth at the operative end of the elongated member is annular in shape whereby the flap of the conduit which is drawn into the mouth on creation of the suction at the mouth is an annular flap.

Preferably the elongated member has a mandrel at its operative end which mandrel has an expanded head, the mouth of the apparatus being located between the head of the mandrel and the operative end of the elongated member. The preferred mandrel has a shaft connecting the mandrel head to the elongated member, the mouth of the apparatus being provided by an annular space surrounding this shaft.

Preferably the mouth of the apparatus is openable and closable. In particular, in the preferred apparatus, the elongated member comprises a barrel having a hollow bore open at the operative end of the elongated member, the mandrel being capable of reciprocable movement in the bore of the barrel so that movement of the mandrel head towards said operative end of the barrel closes the mouth and movement of the mandrel away from the operative end of the barrel opens the mouth of the apparatus. In this case, the mandrel shaft may have mandrel sealing means spaced from the mandrel head, the mouth of the apparatus being located between the mandrel head and the sealing means, the sealing means being reciprocable in the bore of the barrel with the shaft and providing a seal between the shaft and the barrel.

Preferably the suction means includes at least one aperture opening into the mouth of the apparatus whereby application of a vacuum to the aperture creates said suction at the mouth. Where there is a mandrel shaft, the at least one aperture is located in the mandrel shaft between the mandrel head and the mandrel sealing means, the mandrel shaft being hollow and providing a vacuum line connected or connectable to a vacuum source. Preferably the suction means comprises a plurality of apertures arrayed about and preferably along the shaft between the mandrel head and the sealing means.

The apparatus includes controlling means whereby the creation of the suction at the mouth of the apparatus can be controlled. The controlling means can comprise a valve for switching the suction at the mouth of the apparatus on and off. The controlling means may also include a pressure control means connected to connectable between the mouth of the apparatus and a vacuum source which enables the degree of vacuum applied to create the suction at the mouth of the apparatus to be controlled.

For convenience in a freezing works, the elongated member or barrel is attached to a handle enabling the apparatus to be hand-held by an operator in use. In one embodiment, the handle has a trigger to which the mandrel is connected, actuation of the trigger causing said movement of the mandrel in the bore of the barrel. The controlling means valve for switching the suction at the mouth of the apparatus on and off is located on or adjacent the handle and is preferably located on the trigger.

The ring supporting means is most conveniently located adjacent the mouth of the apparatus and is preferably provided substantially by the elongated member or the barrel itself. When the reciprocable mandrel is moved so that the mandrel head closes the mouth of the apparatus, with a flap of the conduit having been drawn into the mouth by suction created thereat, the mandrel head clamps the flap against the operative end of the barrel to prevent its inadvertent dislodgement from the mouth, and the closed mouth facilitates the passage of the stretched elastic ring from the ring supporting means over the mouth and the flap clamped therein and over the mandrel head. The preferred ring releasing means comprises a ring releasing member slidable from a rest position along the elongated member or barrel to dislodge a stretched elastic ring from the ring supporting means whereby the ring can pass over any said flap of the conduit which has been sucked into the mouth of the apparatus and over the mandrel head to contract about the flap passed over and thereby seal or substantially close the conduit. This preferred ring releasing member has a nose portion located adjacent the operative end of the barrel and the stretched elastic ring when fitted on the ring supporting means about the barrel passes over the nose portion, movement of the ring releasing member from its rest position and towards the mandrel head carrying the ring on the nose portion to force the ring off the barrel and over the mandrel head whereupon the ring can dislodge or be dislodged from the nose portion.

In one embodiment of the invention, the ring releasing member is biased to its rest position and has a push member extending rearwardly to adjacent the handle of the apparatus to facilitate its operation by the operator. In another embodiment of the invention, the operation of the ring releasing member is controlled automatically as part of an automatic operating cycle controlled by an automatic control means. In this embodiment, the operation of the mandrel opening and closing the mouth is also controlled by the automatic control means. The apparatus has a manually operated control trigger to initiate an operating cycle.

In another aspect, the present invention broadly consists of a method of sealing or substantially closing a flexible tubular conduit from within the conduit, the method comprising the steps of: inserting an elongated member having an end and a mouth at the operative end operative first into the conduit from an open end of the conduit; creating suction at the mouth and using the suction to draw a flap of the conduit into the mouth; and releasing a stretched elastic ring from about the elongated member adjacent the mouth whereby the released ring contracts about the flap of the conduit to seal or substantially close the conduit.

An elastic ring in a stretched condition is placed on a ring supporting means, possessed or provided by the elongated member adjacent the mouth, prior to the insertion of the elongated member into the conduit. After the release of the elastic ring the elongated member is removed from the conduit.

Preferably the method includes the step whereby vacuum is applied to create a suction at the mouth only after the elongated member has been inserted into the conduit, no suction being created at the mouth during insertion or removal of the elongated member into or from the conduit, and the step of clamping the flap of the conduit drawn into the mouth by the suction, in the mouth, while the ring is being released to pass over and contract about the flap.

The method is suitable for the sealing or substantial closing of a body conduit of an animal, in particular, of a carcass of an animal. The method has been devised especially for sealing the anus of a sheep carcass in a freezing works or other slaughterhouse.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS:

The present invention will become more fully understood from the detailed description given hereinbelow and the accompanying drawings which are given by way of illustration only, and thus, are not limitative of the present invention, and wherein.

Figure 1:
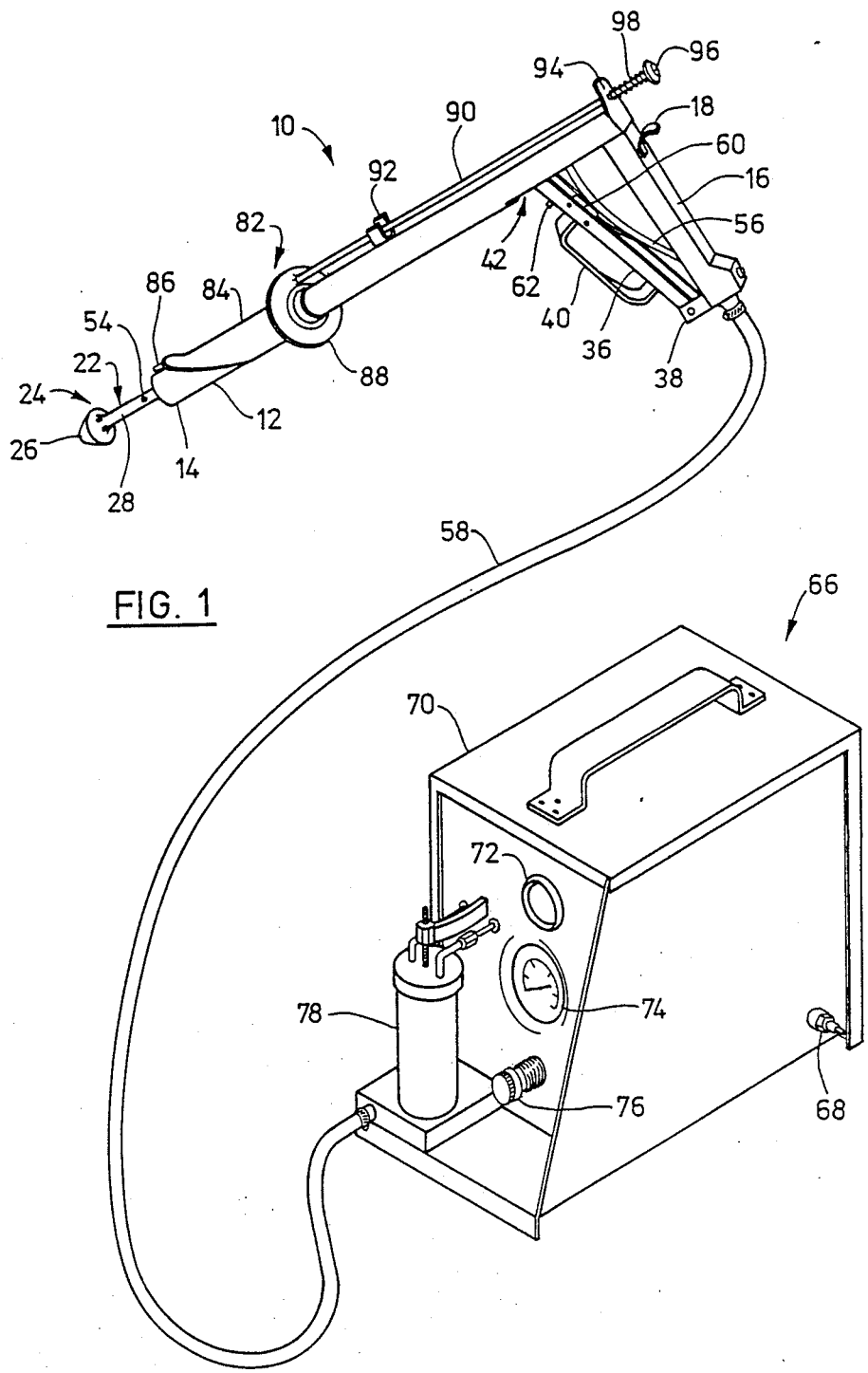
FIG. 1 shows a perspective view of a preferred apparatus according to the prevent invention, this apparatus comprising a hand-held sealing gun connected by a vacuum line to a pressure or vacuum controlling means.
Figure 2:
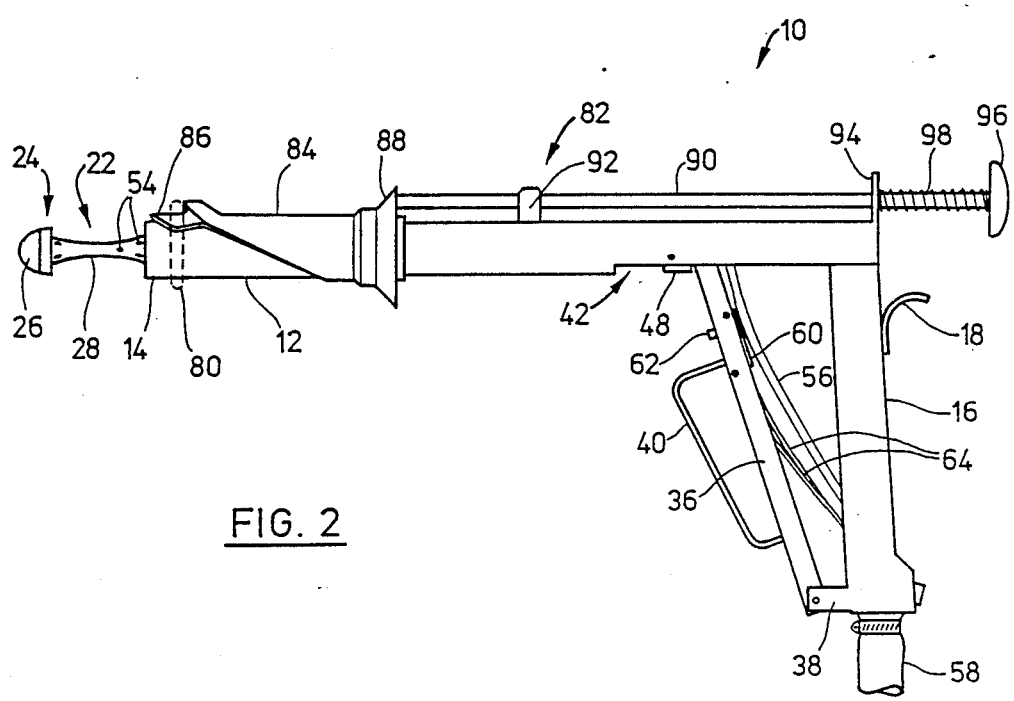
FIG. 2 shows side elevation of the preferred sealing gun.
Figure 3:
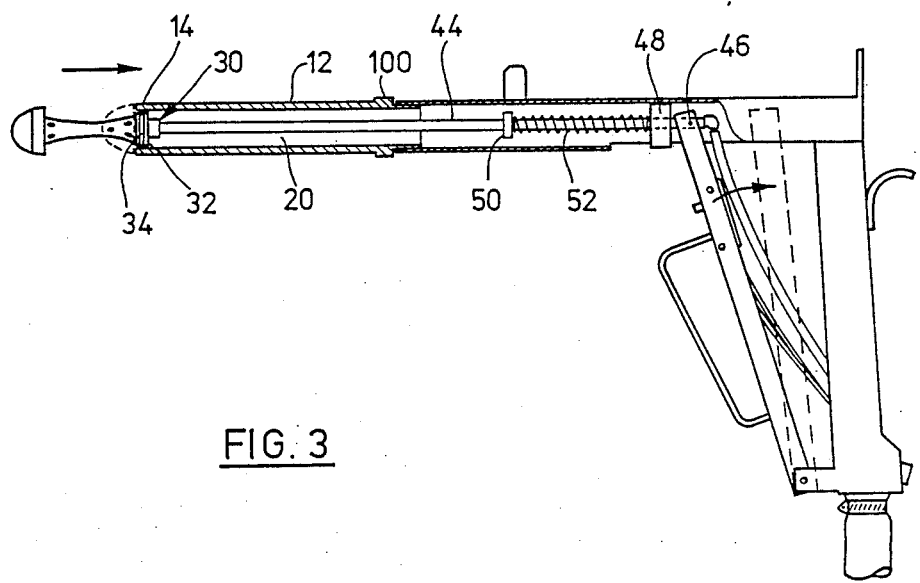
FIG. 3 shows a side elevation of the preferred sealing gun of FIG. 2 but with some parts omitted for clarity and shown partly in cross-section and indicating, in dashed outline and with arrows, the movements of some of the parts of the sealing gun in use.

DETAILED DESCRIPTION OF PREFERRED EMBODIMENTS:

As has been mentioned, the preferred apparatus of the present invention has been devised for use in sealing or substantially closing a flexible tubular conduit, such as the anus of a slaughted animal such as a sheep. Therefore, it is envisaged that the preferred apparatus will be used mostly in slaughterhouses such as abattoirs and freezing works. In such slaughterhouses, the carcasses of sheep are usually dressed manually by skilled operators. Therefore, the preferred apparatus has been designed to be used manually by such an operator. Accordingly, the preferred apparatus comprises a sealing gun 10 which is hand-held in use. The sealing gun has an elongated member or barrel 12 having an operative end 14 and a handle 16 at the end of the barrel opposite its operative end. In FIGS. 1 to 3, the handle is shown as projecting downwardly and slightly rearwardly from the barrel at an angle of about 80°. At the back of the handle and towards its top end, a flange 18 is attached to prevent the hand of the operator from slipping up the handle.

The elongated member or barrel 12 of the sealing gun is designed to be inserted operative end first someway into the anus of the sheep carcass being processed. As best shown in FIG. 3, the preferred elongated member 12 is in the form of a barrel having a hollow bore 20 which bore is open at the operative end of the barrel.

At the operative end of the barrel, the sealing gun has a mouth 22. As will be described in more detail later, the mouth of the sealing gun is designed so that when the operative end of the barrel is inserted in the anus of a sheep carcass and sufficient suction is created at the mouth by suction means, a flap of the anus is drawn into the mouth, it being this flap which is used to seal or substantially close the anal passage. For most effective sealing or substantial closing of the anus, the flap that is drawn into the mouth is preferably an annular flap and for this purpose the mouth itself is annular in shape.

The barrel 12 of the sealing gun has a mandrel 24 at its operative end. The mandrel has an expanded head 26 located outside the barrel. The diameter of the mandrel head can be similar to or a little larger than that of the bore of the barrel. This expanded mandrel head is attached at the free end of a shaft 28, the other end of which is supported within the bore of the barrel. In the preferred apparatus, the mandrel is capable of reciprocable movement in the bore of the barrel. Therefore, in this preferred apparatus the mandrel shaft 28 has a mandrel sealing means 30 at the end of the mandrel shaft 28 opposite that having the mandrel head. The preferred mandrel sealing means comprises a short cylindrical member 32 which is a close but sliding fit in the bore 20 of the barrel. This cylindrical member has an annular grove about its periphery in which a ring shaped seal 34 is fitted.

With the structure of the operative end of the barrel and of the mandrel as described and illustrated, the mouth 22 is provided by the annular space surrounding the mandrel shaft 28 and is therefore located between the mandrel head 26 and the operative end of the barrel and between the mandrel head and the mandrel sealing means 30. With the mandrel being capable of reciprocable movement in the bore of the barrel, the mouth of the sealing gun is capable of being opened and closed. Movement of the mandrel head 24 towards the operative end of the barrel brings the mandrel head close to or against that operative end to close the mouth whereas movement of the mandrel away from the operative end of the barrel opens the mouth of the sealing gun.

A trigger 36 is associated with the handle and operation of the trigger effects the reciprocable movements of the mandrel and hence the opening and closing of the mouth. The trigger is located forwardly of the handle 16 and at its bottom end is pivotally connected between flanges 38 projecting forwardly from the bottom end of the handle. A substantially U-shaped finger guard 40 is attached to and projects from the front of the trigger. The fingers of one hand of an operator, except for the thumb and the index finger can be inserted through the opening between the finger guard and the trigger. A major reason for having the finger guard is to assist the operator in holding the handle and trigger firmly without the hand of the operator slipping. At its top end, the trigger 36 passes through a slot 42 in the underside of the barrel at the handle end of the sealing gun. This slot allows the top end of the trigger to be moved backwards and forwards in the bore of the barrel by a distance equal to the distance that the mandrel is required to move to open or close the mouth of the sealing gun. A shaft 44, which can be an extension of the mandrel shaft 28, connects the mandrel from its sealing means 30 to the top end of the trigger, the connection 46 between the shaft 44 and the top end of the trigger being in pivotal connection. The end of the shaft 44 adjacent the top end of the trigger is supported by a bearing block 48 fixed within the bore of the barrel. The bearing block has a hole through it through which the shaft 44 passes and in which the shaft is slidable. With this construction, the mandrel is moved to close the mouth when the trigger is pulled towards the handle of the sealing gun and the mandrel is moved to open the mouth when the trigger is moved away from the handle. The mandrel head striking the operative end of the barrel and the top end of the trigger striking the bearing block 48 can be used to place limits on the movements of the trigger and the mandrel in either direction.

It is preferable that the mandrel is biased to the open mouth position shown in FIGS. 1, 2 and 3. For this purpose, a stop 50 is attached to the shaft 44 forwards of the bearing block 48 and a compression spring 52 is located between the stop and the bearing block. This spring is compressed when the trigger is pulled towards the handle and acts to return the trigger to the open mouth position of the mandrel when the hand pressure holding the trigger towards the handle is released.

As previously mentioned, the apparatus has suction means whereby suction can be created at the mouth to draw a flap of the anus or other conduit into the mouth. The suction means includes at least one aperture and preferably several apertures opening into the mouth 22 whereby application of a vacuum to the aperture or apertures creates the suction at the mouth. In the preferred form of the invention, the mandrel shaft 28 is hollow and the shaft 44 is tubular, the bore of the tube being connected to the hollow of the mandrel shaft to provide a vacuum line. A plurality of apertures 54 are arrayed about and preferably along the mandrel shaft 28 so that when a vacuum is applied from a vacuum source connected to the tubular shaft 44, suction is created at the mouth of the sealing gun. The vacuum line includes a plastic tube 56, one end of which is connected to the end of the tubular shaft 44 at its end to which the top end of the trigger is pivotally attached. This vacuum line 56 passes down through the bottom of the handle 16 and through a protective flexible plastic pipe 58 attached to the bottom of the handle.

The apparatus includes controlling means whereby the creation of the suction at the mouth can be controlled. In the preferred form of the invention, the controlling means comprises a valve 60 mounted to the trigger and having a press type switch 62 projecting forwardly of the trigger above the finger guard so as to be operable by the index finger of the hand of the operator holding the sealing gun. The construction and arrangement of the apparatus is preferably such that when the switch 62 is depressed, suction is created at the mouth of the sealing gun whereas this suction is stopped on release of the switch.

The valve 60 could be interposed directly in the vacuum line 56 but would then need to be quite robust because of the pressures it would be subject to in use. Therefore, it is preferable that the valve 60 controls, by pneumatic means (though electrical means could be used), the application or not of the vacuum source to the vacuum line at some remote pressure or vacuum control means. The two tubes 64, best shown in FIGS. 2 and 3, pass from the valve 60 through the bottom of the handle 16 and through the protective plastic pipe 58, along with the vacuum line 56, back to the remote pressure control means 66.

Figure 9:
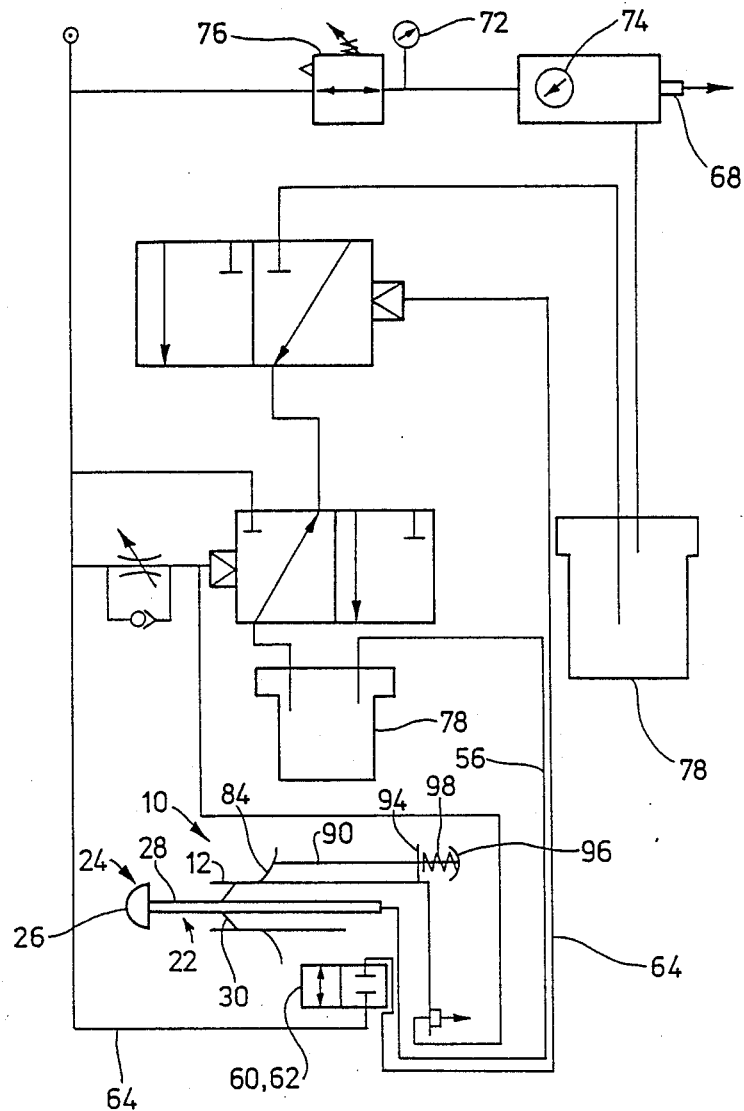
FIG. 9 shows, in schematic form, a preferred pneumatic circuitry used with the apparatus of the invention whereby suction can be created at the mouth of the apparatus.

The pressure or vacuum control means 66 is shown in FIG. 1 and its pneumatic circuitry is shown in schematic form in FIG. 9. In use of the apparatus, the pressure control means is connected between the sealing gun and a vacuum source (not shown). The line from the vacuum source can be snap-fitted in known manner to the connector 68 mounted to the exterior of the housing 70 of the pressure control means shown in FIG. 1. Mounted on the front of the housing 70, are two gauges 72 and 74. Gauge 72 is a vacuum gauge which gives a measure of the vacuum and gauge 74 is a gauge giving a measure of the suction applied at the mouth of the sealing gun. A knob 76 is used to alter the suction force applied. A reservoir 78 is releasably mounted on the front of the housing and another reservoir is located within the housing. The purpose of these reservoirs is to extract foreign matter, in particular liquids, entrained in the air passing through them. The preferred system operates at a vacuum of about 80 to 90 kPa.

The apparatus has ring supporting means provided on or by the barrel for supporting a stretched elastic ring about the barrel. The apparatus also has ring releasing means actuable to release the stretched elastic ring from the barrel whereby the ring can contract about the flap drawn into the mouth to seal or substantially close the anus or other conduit. The ring supporting means is preferably provided substantially by the barrel itself adjacent the mouth of the sealing gun. In FIG. 2, a stretched elastic ring 80 is shown in dotted outline fitted about the operative end of the barrel.

The preferred ring releasing means 82 (which is largely omitted in FIG. 3 for simplicity) has a ring releasing member 84. This member 84, which may be tubular in shape, is slidable from a rest position, that being the position shown in FIG. 2, along the barrel to dislodge the stretched elastic ring 80 from the ring supporting means. On the top side of the barrel, the ring releasing member can have a nose portion 86 which really forms part of the ring supporting means because when the stretched elastic ring is fitted on the ring supporting means about the barrel, it passes over the nose portion as shown in FIG. 2. The nose portion is shaped so that when the ring releasing member is moved towards the mandrel head, the ring is carried on the nose portion and therefore forced off the barrel and over the mandrel head whereupon the ring can dislodge or be dislodged from the nose portion. The ring releasing member 84, and the mandrel head 86, are preferably shaped to facilitate their entry into the anus of the sheep carcass being processed.

At its end remote from the operative end of the barrel, the ring releasing member 84 can have a flared skirt 88 which determines the extent to which the operative end of the barrel is normally inserted into the anus of the carcass. A push rod 90 passes from the skirt through a U-shaped guide 92 attached to the top of the barrel intermediate its length and through a hole in a flange 94 projecting up from the top of the barrel at the handle end of the sealing gun. At its free end beyond the flange 94, the push rod has a knob 96 and a compression spring 98 is located between the flange 94 and the knob 96. This compression spring biases the ring releasing means to its rest position shown best in FIG. 2. A stop 100 (shown in FIG. 3) can be provided on the barrel to define the rest position and prevent the ring releasing member from moving too far back towards the handle of the sealing gun. A rubber ring (not shown) can be placed around the barrel in front of this stop to act as a cushion for the ring releasing member returning to its rest position.

Figure 4:
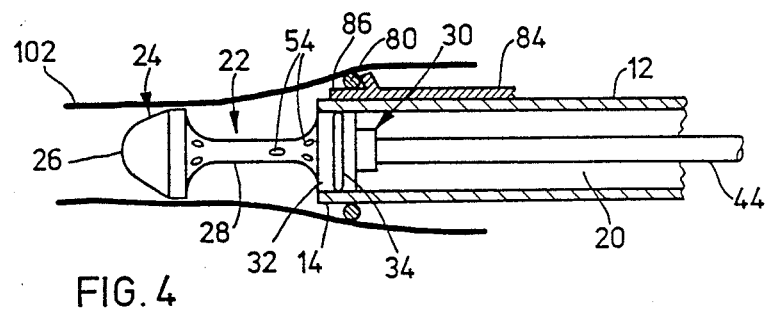
FIGS. 4 to 8 show the operative end of the barrel of the preferred sealing gun and some of the sequence of steps involved in the use of the sealing gun in sealing or substantially closing a flexible tubular conduit.
Figure 5:
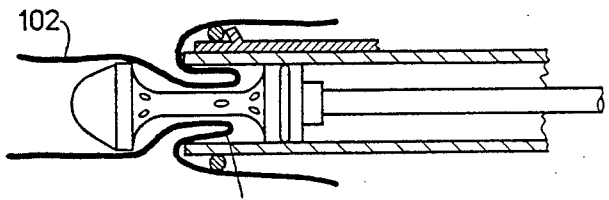
Figure 6:
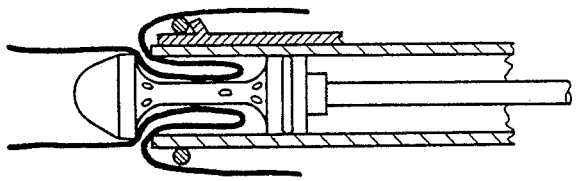

FIGS. 4 to 8 show a sequence of operations in use of the preferred sealing gun of the present invention. Prior to the insertion of the operative end of the barrel into the anus of the sheep carcass, the handle may be pulled to retract the mandrel to the mouth closed position and the switch 62 would normally be released so that no suction was applied at the mouth. These things are done to facilitate the insertion of the mandrel head and operative end of the barrel into the anus. Once positioned properly within the anus the trigger is released to allow the compression spring 52 to push the mandrel to the mouth open position, this being the position shown in FIG. 4. The switch 62 on the handle is then depressed so that suction is created at the mouth of the sealing gun. This suction acts on the portion of the anal wall 102 between the mandrel head and the operative end of the barrel (see FIG. 4) and provided the suction is sufficiently strong, draws an annular flap 104 of the anal wall over the mandrel head and into the mouth 22 of the sealing gun. At the same time, pressure can be applied to the handle by the operator to start retracting the mandrel to the mouth closed position. This step is shown in FIG. 5. FIG. 6 shows the mandrel head close to the mouth closed position. In the mouth closed position the mandrel head clamps the annular anal flap 104 against the operative end of the barrel to prevent its inadvertent dislodgement from the mouth. The clamping should not be so strong that the anal wall is cut.

Figure 7:
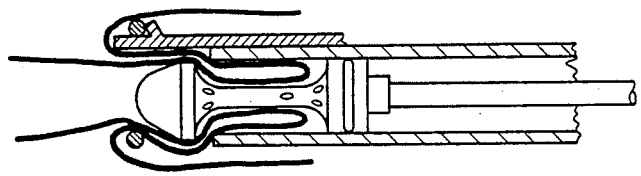
Figure 8:
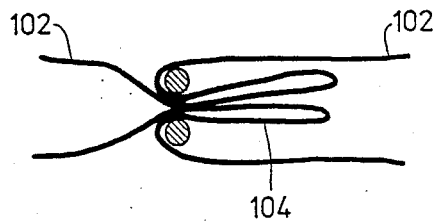

FIGS. 4 to 6 show a stretched elastic ring 80 fitted around the operative end of the barrel and over the nose portion 86 of the ring releasing member 84. This ring obviously is fitted in place before the insertion of the barrel into the anus. In FIG. 7, the ring releasing member has been moved forwardly from its rest position carrying the elastic ring 80 with it off the operative end of the barrel. Because the mouth is closed the ring does not become caught in it but passes over the closed mouth and over the mandrel head so that it can contract about the annular flap. The existence of the annular flap is maintained by it being clamped within the closed mouth of the sealing gun. With the ring having contracted about the annular flap, the operative end of the barrel and the mandrel head can be withdrawn from the anus. Firstly the mouth is opened to release the flap and preferably the suction at the mouth is stopped. If the contracted ring has not itself dislodged from the nose portion of the ring releasing member then dislodgment takes place as the barrel is withdrawn. FIG. 8 shows the finished result, with the contracted elastic ring sealing or substantially closing the anal passage.

The above described apparatus and method set forth the preferred form of the invention and indicate some possible modifications but various other modifications can be made to the apparatus and to the method without departing from the scope of the invention as has been broadly defined. For a start, the invention can be applied to the sealing or substantial closing of the anal passages of other animals, including the carcasses of goats and cattle, for example. Furthermore, the invention can be applied to the sealing or substantial closing of other types of flexible tubular conduits, whether these be body conduits of an animal or not.

Figure 10:
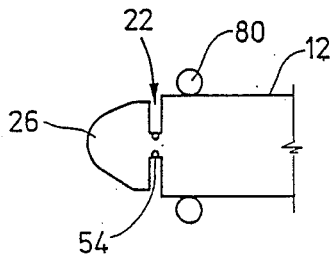
FIGS. 10 and 11 show in simplified form two modified embodiments of the operative end of a sealing gun according to the present invention.
Figure 11:
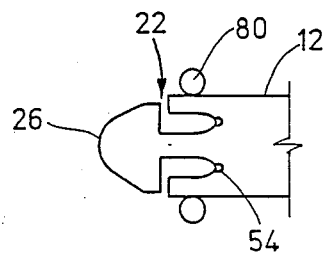

FIGS. 10 and 11 show the operative end of the barrel of two other embodiments of the invention, with parts corresponding to parts already described being given like numbers. The ring releasing means is not shown. These embodiments still have a mandrel at the operative end of the barrel but the mandrel is fixed in position so that the mouth is always open. In such cases, the relative dimensions of the mouth opening and the thickness of the elastic ring must be such that the ring is not caught in the mouth when it is being released from the operative end of the barrel but passes over the open mouth and over the mandrel head.

In some applications it may not be necessary to have the apparatus in the form of a sealing gun; instead the barrel can be fixed to a base or some other support.

Figure 12:
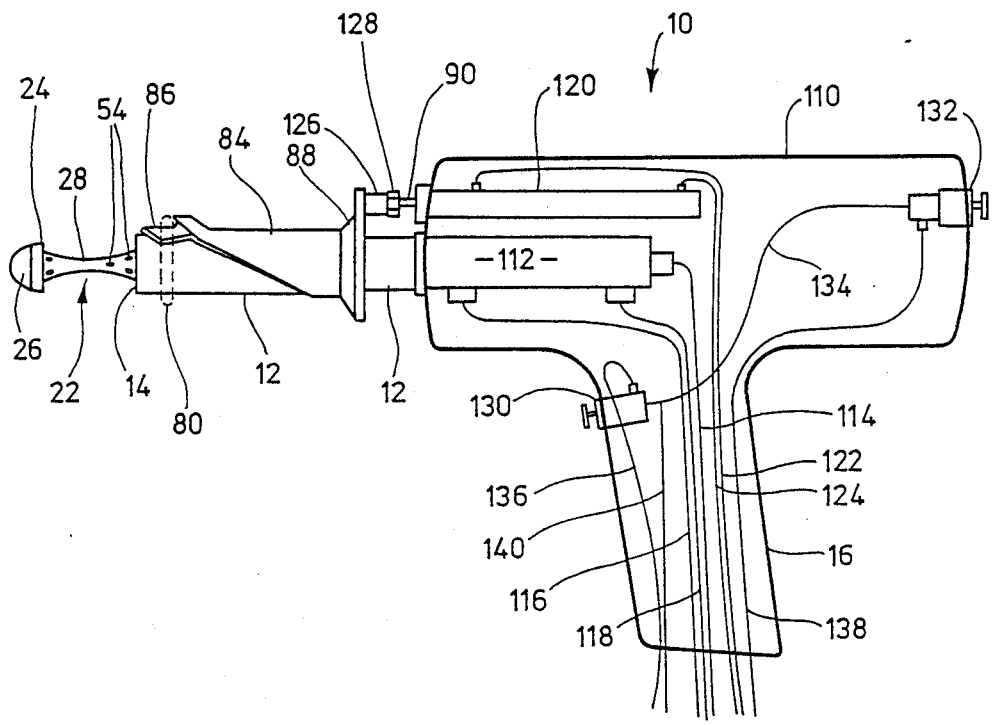
FIG. 12 shows, in somewhat diagrammatic form, a side elevation of another preferred sealing gun according to the present invention.

Another embodiment of sealing gun according to the present invention is shown in somewhat diagrammatic form in FIG. 12. This embodiment is designed to be used with the automatic control circuitry shown in FIG. 13. In general, parts shown in FIGS. 12 and 13 which correspond to parts of the embodiments described previously are given like reference numbers.

In FIG. 12 the rear end of the sealing gun is in the form of a housing 110 which includes the handle 16. The housing has a side (not shown) which is removable for access to the interior of the housing for maintenance of the components therein. From the forward end of the housing the barrel 12 of the sealing gun projects forwardly. The mandrel 24 is connected by a hollow shaft to the piston of a double-acting pneumatic ram 112 located within the housing. Although this hollow shaft is not shown in FIG. 12, it is similar to the hollow shaft 44 shown in FIG. 3. The end of the shaft within the ram 112 is connected to the air line 114 which, along with other air lines, passes out through the bottom of the handle 16 and, although not shown in FIG. 12, through a protective flexible plastics pipe such as the pipe 58 shown in FIG. 2, to the automatic control circuitry shown in FIG. 13. The air line 114 is comparable with the vacuum line 56 shown in FIGS. 2 and 3. When a vacuum is applied to the air line 114, suction is created at the mouth 22 of the sealing gun. However, as will be explained later, air can be blown back through the air line 114 and out through the aperture 54 at the mouth of the sealing gun to clear any blockages in these apertures or in the mouth itself. Air lines 116 and 118 are connected to the ram 112 and are used to control the movement of its piston and hence control the movement of the mandrel 24 to open and close the mouth of the sealing gun.

This embodiment of sealing gun also has a ring releasing member 84 with a flared skirt 88, the functions of these having been described earlier with respect to other embodiments of the invention. The push rod 90 attached to the skirt is attached at its other end to the piston of a second double-acting pneumatic ram 102 located within the housing 110. Air lines 122 and 124 are connected to this ram 120 to control the movement of its piston and hence the extension and retraction of the ring releasing member 84. The end of the push rod 90 can be screwed into a boss 126 attached to the back of the skirt 88 and a lock nut 128 can be screwed on to the rod 90 so that adjustment of the ring releasing member 84 in its rest position can be effected, this thereby altering the degree of extension of the ring releasing member when it moves to dislodge a ring 80 from the operative end of the barrel 12.

Figure 13:
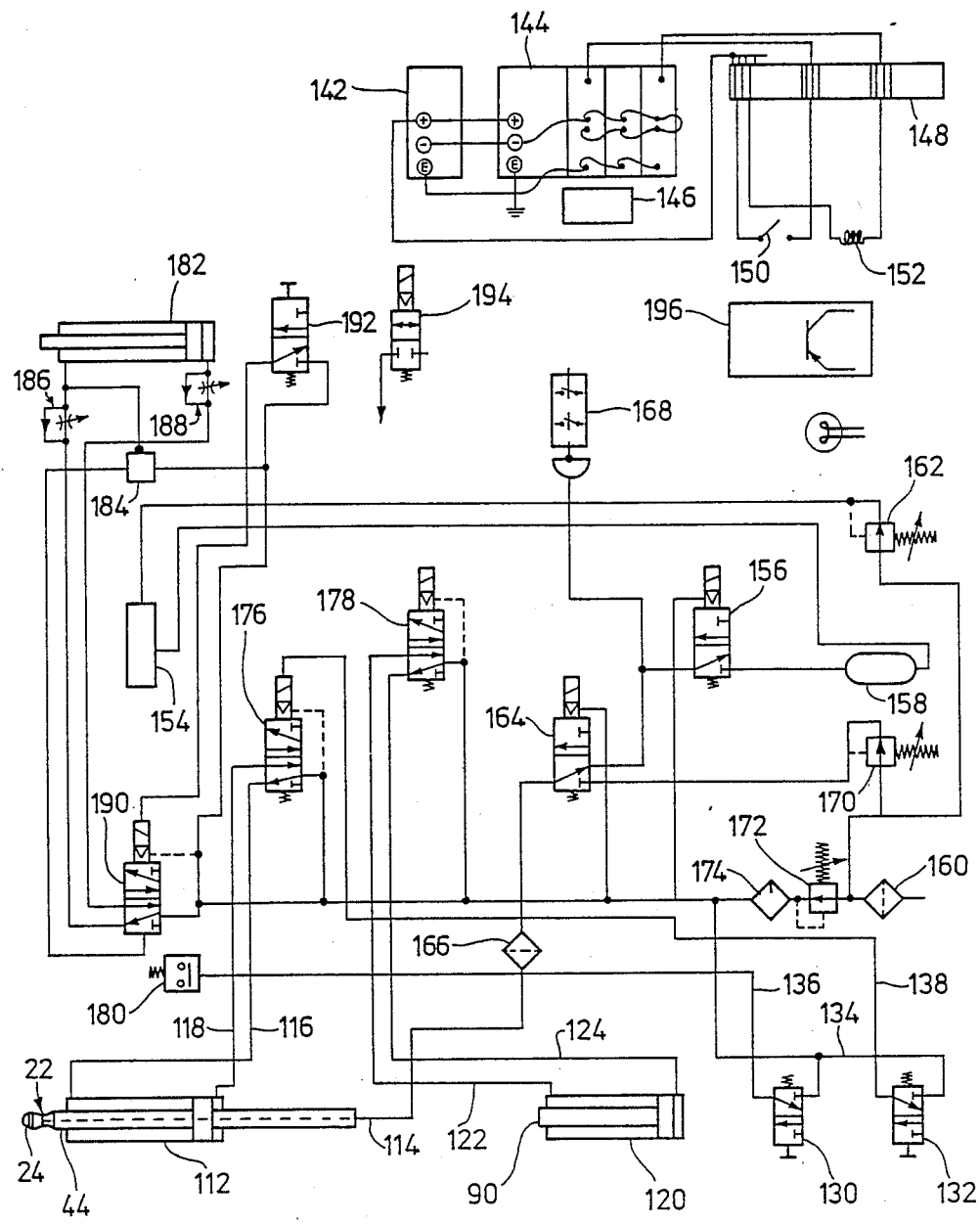
FIG. 13 shows, in schematic form, automatic control circuitry for controlling the operations of the sealing gun of FIG. 12.

The sealing gun of FIG. 12 has a button valve 130 which provides a manually operated trigger for initiating an automatic operating cycle under the control of the automatic control means circuitry shown in FIG. 13. A second button valve 132 is mounted on the rear end of the housing for ready access by an operator. An air line 134 connects the two button valves 130 and 132 and from each button valve an air line 136 and 138 respectively, along with an air line 140 which is connected to the air line 134 and which is therefore common to both button valves, passed down through the bottom of the handle 16 and thence to the control circuitry of FIG. 13. Many of the components of the sealing gun of FIG. 12 are shown in FIG. 13 and are given the same reference numbers.

In FIG. 13, the reference number 142 represents an electrical power supply which is connected to a programmable logic controller 144, this being controlled by a program from programmer 146. Power from the power supply 142 and signals from the programmable logic controller 144 are delivered to a bank of terminals 148. The reference number 150 represents the switches and the reference number 152 represents the coils of a plurality of solenoid valves, these being the solenoid valves forming part of the pneumatic circuitry shown below the electrical circuitry in FIG. 13, connected to the bank of terminals 148. Thus, according to the program fed to it, the programmable logic controller controls the timing of the opening and closing of the various solenoid valves forming part of the pneumatic circuitry of FIG. 13, and hence controls the operating cycle of the sealing gun.

In FIG. 13, the pneumatic circuitry is connected to a vacuum pump 154. The solenoid valve 156 stops and starts the vacuum flow. A reservoir 158 is included in the air line which connects the solenoid valve to the vacuum pump. The pneumatic circuitry is also connected, through a main air inlet filter 160, to an air supply. In an air line between the air inlet filter and the vacuum pump, a pressure regulator 162 is provided for regulating the air pressure to the vacuum pump.

The air line 114 from the mandrel 24 is connected to a solenoid valve 164 via a water trap 166. This solenoid valve 164 is connected to the vacuum pump 154 through the solenoid valve 156, to a vacuum switch 168 which detects the presence of a vacuum, and to the air supply through a pressure regulator 170. Therefore, the solenoid valve 164 controls whether it is a vacuum which is applied to the mouth 22 of the sealing gun or whether it is air that is blown back for clearing any blockages in the mouth.

Adjacent the main air inlet filter 160, a main pressure regulator 172 is provided followed by a lubricator 174 which lubricates the air delivered to all valves and to all cylinders of the various pneumatic rams used. It can be seen in FIG. 13 that the air line from these components is connected to the button valves 130 and 132 contained within the housing of the sealing gun. There are also connections to solenoid valves 176 and 178 which control the operations of the pneumatic rams 112 and 120 respectively, these being the pneumatic rams located within the housing of the sealing gun. A pressure switch 180 is connected to the button valve 130. The pressure switch senses the air pressure signal from the button valve and changes this into an electrical signal which activates the programmable logic circuit to commence an operating cycle.

FIG. 13 shows two accessory features. The first is a ring feed system which stretches rings and holds them in a suitable position for loading on to the ring supporting means of the sealing gun. This ring feeding system has a ram 182 which has a reciprocable piston which pushes rubber rings along a gradually expanding conical shaft to expand the rings and to move them into a position ready to be loaded on to the sealing gun. A pressure drop sensor valve 184 senses if a ring is in the ready position to be loaded on to the sealing gun. Flow regulators 186 and 188 are used to control the amount of air passing through the air lines to the ram 182, these air lines being connected to a solenoid valve 190 and thence to a manually operated valve 192. The valves 190 and 192 control the operation of the ram 182, the manually operated valve 192 being available to override the operation of solenoid valve 190.

The other accessory feature is a washer available to wash the operative end of the sealing gun when the mouth is open. A solenoid valve 194 is connected between a water supply and the gun wash itself. A proximity sensor 196 can be used to sense when the operative end of the sealing gun is placed in the gun washer, it then sending a signal to the solenoid valve 194 to open the valve for washing of the gun. The operations of these components can also be controlled by the programmer through the programmable logic circuit so that they are synchronized with the operations of the sealing gun itself in order to achieve an operating cycle as detailed below.

Prior to use, the sealing gun preferably has its mouth closed. This makes it easier for an operator to insert the operative end of the gun into the flexible tubular conduit, such as the anus of a sheep carcass, required to be closed or sealed. The automatic operating cycle commences with the operator actuating the button valve 130. This actuates the first ram 112 so as to open the mouth 22 of the gun. At the same time vacuum is applied to the mouth to create a suction there to draw an annular flap of the conduit into the mouth. After a time interval predetermined by the program, the first ram is actuated to retract the mandrel and hence close the mouth, this clamping the flap in the mouth. With the flap clamped in the closed mouth, the application of vacuum to the mouth is discontinued though this discontinuance of the vacuum can occur at any time after the closing of the mouth. The second ram 120 is then automatically actuated to move the ring releasing member from its rest position to dislodge a ring from the ring supporting means and then to return the ring releasing member to its rest position. This is followed by actuation of the first ram 112 so as to move the mandrel to re-open the mouth, thereby releasing the ringed flap of the now sealed conduit and allowing the operative end of the sealing gun to be withdrawn from the conduit. In this form of the invention, a subsequent actuation of the first ram may automatically occur to move the mandrel so as to close the mouth to be ready for commencement of a new cycle. However, with an air blowing system provided as has been described with reference to FIG. 13 in particular, air is preferably blown through the apertures of the mouth to clear any blockages before the mouth is closed prior to commencement of the new cycle.

Where a washing system is provided as has been described, the automatic control system can be programmed so that the mouth of the sealing gun does not close prior to the commencement of a new cycle until it has been washed. In this case the open-mouthed sealing gun with air being blown out through the mouth can be inserted in the washing station, the proximity sensor 196 detecting when that has been done and opening the water supply by actuating valve 194. After a pre-set wash period, the water supply is cut off, the blowing of the air out through the mouth of the sealing gun is stopped and the mouth is then closed ready for the commencement of a new cycle.

While two main embodiments of the invention have been described and illustrated, along with some variations of these, these have been given by way of example only. It will be appreciated that other modifications can be made to the apparatus and to the method of the present invention without departing from the scope of the following claims defining the invention.

We claim:

1. An apparatus for sealing or substantially closing a flexible tubular conduit from within the conduit, the apparatus comprising:
   an elongated member having an operative end which elongated member is insertable operative end first into the conduit from an open end of the conduit;
   a mouth at the operative end of the elongated member;
   ring supporting means provided on or by the elongated member for supporting a stretched elastic ring about the elongated member;
   suction means for creating suction at the mouth to draw a flap of the conduit into the mouth; and
   ring releasing means for releasing the stretched elastic ring from the elongated member and over the mouth and flap drawn thereinto whereby the ring can contract about the flap to seal or substantially close the conduit.

2. The apparatus as claimed in claim 1, wherein the mouth of the apparatus is openable and closable.

3. The apparatus as claimed in claim 1, wherein the mouth at the operative end of the elongated member is annular in shape whereby the flap of the conduit which is drawn into the mouth on creation of the suction at the mouth can be an annular flap.

4. The apparatus as claimed in claim 1, wherein the elongated member has a mandrel at its operative end which mandrel has an expanded head, the mouth of the apparatus being located between the head of the mandrel and the operative end of the elongated member.

5. The apparatus as claimed in claim 4, wherein the mandrel has a shaft connecting the mandrel head to the elongated member, the mouth of the apparatus being provided by an annular space surrounding this shaft.

6. The apparatus as claimed in claim 5, wherein the elongated member comprises a barrel having a hollow bore open at the operative end of the elongated member, the mandrel being capable of reciprocable movement in the bore of the barrel so that movement of the mandrel head towards said operative end of the barrel closes the mouth and movement of the mandrel away from the operative end of the barrel opens the mouth of the apparatus.

7. The apparatus as claimed in claim 6, wherein the mandrel shaft has mandrel sealing means spaced from the mandrel head, the mouth of the apparatus being located between the mandrel head and the sealing means, the sealing means being reciprocable in the bore of the barrel with the shaft and providing a seal between the shaft and the barrel.

8. The apparatus as claimed in claim 7, wherein the suction means includes at least one aperture opening into the mouth of the apparatus whereby application of a vacuum to the aperture creates said suction at the mouth and said at least one aperture is located in the mandrel shaft between the mandrel head and the mandrel sealing means, the mandrel shaft being hollow and providing a vacuum line connected or connectable to a vacuum source.

9. The apparatus as claimed in claim 1, wherein the apparatus includes controlling means whereby the creation of the suction at the mouth of the apparatus can be controlled and the controlling means comprises a valve for switching the suction at the mouth of the apparatus on and off.

10. The apparatus as claimed in claim 6, wherein the barrel is attached to a handle enabling the apparatus to be hand-held by an operator in use, the handle having a trigger to which the mandrel is connected, actuation of the trigger causing said movement of the mandrel in the bore of the barrel, and a controlling means valve for switching the suction at the mouth of the apparatus on and off located on or adjacent the handle.

11. The apparatus as claimed in claim 6, wherein the ring supporting means is located adjacent the mouth of the apparatus and is provided substantially by the barrel itself.

12. The apparatus as claimed in claim 6, wherein when the reciprocable mandrel is moved so that the mandrel head closes the mouth of the apparatus, with a said flap of the conduit having been drawn into the mouth by suction created thereat, the mandrel head clamps the flap against the operative end of the barrel to prevent its inadvertent dislodgement from the mouth, and the closed mouth facilitates the passage of the stretched elastic ring from the ring supporting means over the mouth and the flap clamp therein and over the mandrel head.

13. The apparatus as claimed in claim 6, wherein the ring releasing means comprises a ring releasing member slidable from a rest position along the elongated member or barrel to dislodge a said stretched elastic ring from the ring supporting means whereby the ring can pass over any said flap of conduit which has been sucked into the mouth of the apparatus and over the mandrel head to contract about the flap passed over and thereby seal or substantially close the circuit.

14. The apparatus as claimed in claim 13, wherein the ring releasing member has a nose portion located adjacent the operative end of the barrel and the stretched elastic ring when fitted on the ring supporting means about the barrel passes over the nose portion, movement of the ring releasing member from its rest position and towards the mandrel head carrying the ring on the nose portion to force the ring off the barrel and over the mandrel head whereupon the ring can dislodge or be dislodged from the nose portion.

15. The apparatus as claimed in claim 13, wherein the ring releasing member is biased to its rest position and has a push member extending rearwardly to adjacent the handle of the apparatus to facilitate its operation by an operator.

16. The apparatus as claimed in claim 13, wherein the mandrel is connected to a first pneumatic ram which effects its reciprocable movement and hence the opening and closing of the mouth of the apparatus, and the ring releasing member is connected to a second pneumatic ram whereby the ring releasing member can be moved from its rest position to dislodge a ring from the ring supporting means and then returned to its rest position.

17. The apparatus as claimed in claim 16, wherein the apparatus has a manually operated trigger connected to an automatic control means which controls the application of a vacuum to the mouth of the apparatus and hence the creation of said suction thereat when the apparatus is connected to a vacuum source, and also controls the operation of the first and the second pneumatic rams, whereby on actuation of the trigger an automatic operating cycle is commenced, said cycle comprising the following steps: actuation of the first ram to move the mandrel so as to open the mouth of the apparatus, application of vacuum to the mouth to create said suction thereat, actuation of the first ram to retract the mandrel and close the mouth, discontinuance of the vacuum and hence the suction at the mouth at any time after the closing of the mouth, actuation of the second ram to move the ring releasing member from its rest position to dislodge a ring from the ring supporting means and then to return the ring releasing member to its rest position, actuation of the first ram to move the mandrel to re-open the mouth, and a subsequent actuation of the first ram to move the mandrel to close the mouth ready for commencement of a new cycle.

18. The apparatus as claimed in claim 17, wherein the mouth of the apparatus is also connected to an air line through the automatic control means and said automatic operating cycle includes the step of blowing air out through the mouth to clear any blockages therein following the step of reopening the mouth and before the closing again of the mouth ready for commencement of the new cycle.

19. The apparatus as claimed in claim 18, wherein the apparatus has a manually operated override control which when actuated at any time in the cycle actuates the first ram to move the mandrel to open the mouth, when the mouth is not open already, and also blows air out through the mouth to clear any blockages therein, and subsequently actuates the first ram to move the mandrel to close the mouth ready for commencement of the new cycle.

20. The apparatus as claimed in claim 19, wherein the apparatus includes a washing station which has a sensor associated therewith to detect the presence of the mouth-end of the apparatus therein, it being necessary following reopening of the mouth and while air is being blown out through the mouth to wash the open mouth at the washing station so that said sensor can determine when the first ram is actuated to move the mandrel and close the mouth ready for commencement of said new cycle.

21. A method of sealing or substantially closing a flexible tubular conduit from within the conduit, the method comprising the steps of: inserting an elongated member having an operative end and a mouth at the operative end operative end first into the conduit from an open end of the conduit; creating suction at the mouth and using the suction to draw a flap of the conduit into the mouth; and releasing a stretched elastic ring from about the elongated member adjacent the mouth whereby the released ring contracts about the flap of the conduit to seal or substantially close the conduit.

22. The method as claimed in claim 21, including a step of placing an elastic ring in a stretched condition on a ring supporting means, possessed or provided by the elongated member adjacent the mouth, prior to the insertion of the elongated member into the conduit and a step of removing the elongated member from the conduit after the release of the elastic ring.

23. The method as claimed in claim 22, including a step whereby vacuum is applied to create said suction at the mouth only after the elongated member has been inserted into the conduit, no suction being created at the mouth during insertion or removal of the elongated member into or from the conduit.

24. The method as claimed in claim 23, including a step of clamping the flap of the conduit drawn into the mouth by the suction, in the mouth, while the ring is being released to pass over and contract about the flap.

25. The method as claimed in claim 21, wherein the method is applied to the sealing or substantial closing of a body conduit of the carcass of an animal.

* * * * *